No. 628,819. Patented July 11, 1899.
F. KÖHN.
BARREL CLOSURE.
(Application filed Dec. 21, 1898.)
(No Model.)
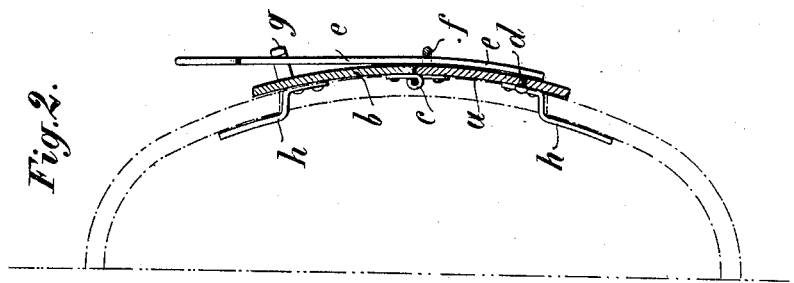
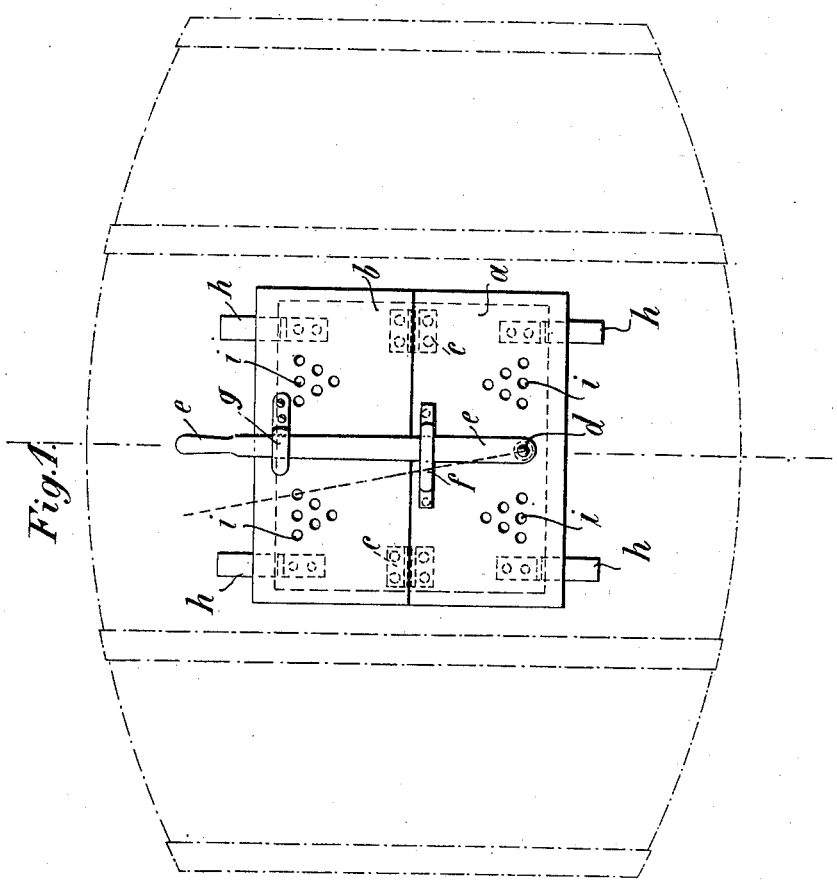
Witnesses
Inventor:
Franz Köhn
By Munn
Attorneys.

UNITED STATES PATENT OFFICE.

FRANZ KÖHN, OF PLOEN, GERMANY.

BARREL-CLOSURE.

SPECIFICATION forming part of Letters Patent No. 628,819, dated July 11, 1899.

Application filed December 21, 1898. Serial No. 699,929. (No model.)

*To all whom it may concern:*

Be it known that I, FRANZ KÖHN, a subject of the King of Prussia, German Emperor, residing at Ploen, in the Kingdom of Prussia, Germany, have invented certain new and useful Improvements in Covers for Barrels for the Transport of Fish, (for which I have applied for a patent in England and which application is dated November 22, 1898,) of which the following is a specification.

Barrels which are intended for the transport of fish are usually provided with large openings to enable the fish to be conveniently put in, which openings can be closed with lids or covers during transit.

This invention consists of a cover for barrels of this description which only requires a simple movement of the hand to fasten or unfasten it instead of the manipulation of several binding-screws and the like, as in covers heretofore in use. The separate parts of the improved cover are also so simple that there is no liability to injury, neither does the cover act injuriously on the parts of the barrel itself, as is more or less the case with the covers at present in use.

In the accompanying drawings, Figure 1 is a plan view, and Fig. 2 a section, of one form of cover constructed in accordance with this invention.

The lid or plate forming this cover consists of two parts $a$ and $b$, hinged together by strong hinges $c$. A lever $e$ is fulcrumed at $d$ to the part $a$, and its movement is guided and limited by the stirrup-piece $f$, which is also firmly attached to $a$. On the part $b$ of the lid a catch or hasp $g$ is fastened, the conical nose of which catches over the lever $e$.

On the under sides of the lids or plates $a$ and $b$ are riveted the hasps or catches $h$, and air-holes $i$ of suitable size and number are provided, as usual, for the purpose of admitting air to the barrel.

The mode of closing depends on the toggle-like action exerted on the lids $a$ and $b$ by the slightly-flexible lever $e$ when being moved under the nose of the catch $g$, the edges of the lids lying on the edges of the opening in the barrel, while the hasps or catches $h$ engage with the inner edges of such opening, as shown, and prevent the lids $a$ and $b$ from being pressed out. If the lever $e$ is moved away from under the catch or hasp $g$, the lids $a$ and $b$, with the hasps or catches $h$, can be lifted up, as the halves of the cover hang together by the hinges $c$ and only project slightly over the edges of the opening in the staves of the barrel.

In order to close the cover, it is only necessary to move the lever $e$, which is the work of a moment only and entails no appreciable wear of the parts.

In order to prevent theft in transit, the lever $e$ and the catch or hasp $g$ can be easily secured by sealing, by a padlock, or other suitable device.

What I claim, and desire to secure by Letters Patent of the United States, is—

A cover for barrels for the transport of fish, which consists of two hinged lids $a$ $b$, which cover the opening in the barrel, and are furnished with hasps or catches $h$ engaging with the inner edges of such opening, and are held in position by a lever $e$, pushed under a catch or hasp $g$, substantially as described with reference to the drawings.

In testimony whereof I have hereunto set my hand in the presence of two witnesses.

FRANZ KÖHN.

Witnesses:
 AUGUST LÜHRS,
 W. P. LEONHARD.